(12) United States Patent
Zhang et al.

(10) Patent No.: US 9,797,526 B2
(45) Date of Patent: Oct. 24, 2017

(54) RISER ASSEMBLY AND METHOD OF INSTALLING A RISER ASSEMBLY

(71) Applicant: GE Oil & Gas UK Limited, Nailsea, Bristol (GB)

(72) Inventors: Yanqiu Zhang, Houston, TX (US); Zhimin Tan, Katy, TX (US); Yucheng Hou, Katy, TX (US); Jiabei Yuan, Houston, TX (US); Linfa Zhu, Houston, TX (US)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 0 days.

(21) Appl. No.: 14/856,266

(22) Filed: Sep. 16, 2015

(65) Prior Publication Data

US 2017/0074425 A1    Mar. 16, 2017

(51) Int. Cl.
| | |
|---|---|
| *E21B 17/01* | (2006.01) |
| *F16L 1/235* | (2006.01) |
| *F16L 1/14* | (2006.01) |
| *F16L 1/24* | (2006.01) |
| *F16L 1/26* | (2006.01) |
| *F16L 1/18* | (2006.01) |

(52) U.S. Cl.
CPC ............ *F16L 1/235* (2013.01); *E21B 17/012* (2013.01); *E21B 17/015* (2013.01); *F16L 1/14* (2013.01); *F16L 1/18* (2013.01); *F16L 1/24* (2013.01); *F16L 1/26* (2013.01)

(58) Field of Classification Search
CPC ...................................................... F16L 1/235
USPC ................... 405/154.1, 158, 168.1, 171, 172
See application file for complete search history.

(56) References Cited

U.S. PATENT DOCUMENTS

| | | | |
|---|---|---|---|
| 2008/0317555 A1* | 12/2008 | De Aquino | ............ E21B 17/015 405/195.1 |
| 2013/0292129 A1 | 11/2013 | Tan et al. | |
| 2013/0309015 A1* | 11/2013 | Mille | .................. E21B 41/0007 405/168.1 |
| 2015/0060079 A1* | 3/2015 | Clements | ............... E21B 17/015 166/350 |

OTHER PUBLICATIONS

International Search Report and Written Opinion of the International Searching Authority, dated Nov. 30, 2016, for corresponding International Application No. PCT/GB2016/052735, 11 pages.

* cited by examiner

*Primary Examiner* — Sean Andrish
(74) *Attorney, Agent, or Firm* — Klarquist Sparkman, LLP

(57) ABSTRACT

A riser assembly and method of installing a riser assembly are disclosed. The riser assembly includes a first attachment element connected to a first portion of flexible pipe and a second attachment element connected to a second portion of flexible pipe. The first attachment element and second attachment element are connected by at least one tether element, via a fixed structure in a configuration such that, in use, in response to movement of the first and second portions of flexible pipe, the tension load at any moment in time, at each attachment element, remains substantially equal.

15 Claims, 6 Drawing Sheets

RISER ASSEMBLY AND METHOD OF INSTALLING A RISER ASSEMBLY

FIELD

The present invention relates to a riser assembly and method of installing a riser assembly. In particular, but not exclusively, the present invention relates to a riser assembly having a portion thereof tethered to a fixed structure.

BACKGROUND

Traditionally flexible pipe is utilised to transport production fluids, such as oil and/or gas and/or water, from one location to another. Flexible pipe is particularly useful in connecting a sub-sea location (which may be deep underwater) to a sea level location. The pipe may have an internal diameter of typically up to around 0.6 meters (e.g. diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the layers of the flexible pipe body is increased.

The end fittings of a flexible pipe may be used for connecting segments of flexible pipe body together or for connecting them to terminal equipment such as a rigid sub-sea structures or floating facilities. As such, amongst other varied uses, flexible pipe can be used to provide a riser assembly for transporting fluids from a sub-sea flow line to a floating structure. In such a riser assembly a first segment of flexible pipe may be connected to one or more further segments of flexible pipe. Each segment of flexible pipe includes at least one end fitting. FIG. 2 illustrates a riser assembly 200 suitable for transporting production fluid such as oil and/or gas and/or water from a sub-sea location 201 to a floating facility 202.

FIG. 3 illustrates a so-called tethered wave riser configuration (i.e. a wave configuration that has been tethered). This known configuration is used to restrain riser motion at the lower section of the riser. The riser assembly 300 includes a flexible pipe 303, and at least one buoyancy section 304 including one or more buoyancy elements 305. The riser is restrained at a lower section near the touchdown region by a tether clamp 306 and a tether element 307 connected between the tether clamp 306 and a gravity base 308 on the sea bed. The riser may require plural tether elements with respective clamps so as to tether different points along the riser. In this way, riser motion can be reduced in the lower section of the riser.

In some tethered wave riser configurations, the tension on the tether clamp can be extremely high, especially in very severe environments. This is because the touchdown zone in particular can experience a relatively larger degree of movement as a result of displacements of the end of the pipe at the vessel/platform, stemming from wave, wind or tidal actions, or the like, or from the effect of currents on the pipe in the water column, these displacements being transmitted along the pipe to the tether clamp and touch-down regions. The relatively large movements at the touch-down zone for the riser can be damaging to the riser because the interaction between the pipe and the sea bed (including abrasive rock and/or other existing pipework systems etc. in the vicinity) could damage and ultimately cause a breach to the outer polymer sheath of the pipe, allowing corrosion to occur on the armour wires which reinforce the pipe.

In some extreme conditions the tension load at the clamp may exceed the maximum design load of all currently available clamps, which is typically around 50 Tonnes (50,000 Kg) (e.g. for an eight inch pipe in 1,800 meters water depth). If the tension at the clamp exceeds the maximum design load of the clamp the clamp could fail. This could result in the clamp sliding down (or along) the flexible pipe and could thereby damage the outer sheath or even underlying layers of the pipe body.

Previously, it has been suggested to use relatively longer clamps so that the tension is distributed across a longer length of the riser (higher contact area equals higher friction between the tether clamp and the pipe and therefore higher load capability). However, longer clamps can be more difficult to handle, especially during transportation of a pipe or during installation, and still may not be able to withstand extreme tension loads for certain riser assemblies.

Particularly in deep water and extreme environments, there is a need to provide a riser assembly having a tethered portion, where total tension loads of around 100 Tonnes or more (100,000 Kg), for example, are accommodated.

Particularly also in shallow water where there is significant wave, tidal and current influence on the pipe and the vessel to which it is connected there is a potential for periodic high tension loading, as well as regular high degrees of dynamic movement (bending, and tension resulting from bending). These combined with the physical space constraints imposed by the shallow water can lead to it being difficult to incorporate long tether clamps into the design of the pipe configuration.

SUMMARY

According to a first aspect of the present invention there is provided a riser assembly for transporting fluid from a subsea location comprising:
  a first attachment element connected to a first portion of flexible pipe;
  a second attachment element connected to a second portion of flexible pipe;
  wherein the first attachment element and second attachment element are connected by at least one tether element, via a fixed structure in a configuration such that, in use, in response to movement of the first and second portions of flexible pipe, the tension load at any moment in time, at each attachment element, remains substantially equal.

According to a second aspect of the present invention there is provided a method of installing a riser assembly for transporting fluid from a subsea location, the method comprising:

connecting a first attachment element to a first portion of flexible pipe;

connecting a second attachment element to a second portion of flexible pipe; and connecting the first and second attachment elements to each other with a tether element, via a fixed structure in a configuration such that, in use, in response to movement of the first and second portions of flexible pipe, the tension load at any moment in time, at each attachment element, remains substantially equal.

Certain embodiments of the invention provide the advantage that a tethered riser configuration can be provided that is suitable to deal with high differential tensions induced by extreme environmental conditions.

Certain embodiments of the invention provide the advantage that a tethered riser configuration can be provided where a total tension load at a tethered portion of the riser can be around 100 Tonnes or more.

Certain embodiments of the invention provide the advantage that a tethered riser configuration can be provided with reduced risk of tether clamp failure compared to known configurations.

Certain embodiments of the invention provide the advantage that tension loads at tether clamps can be controlled in response to movement of the riser assembly.

BRIEF DESCRIPTION OF THE DRAWINGS

Embodiments of the invention are further described hereinafter with reference to the accompanying drawings, in which.

DETAILED DESCRIPTION

Figure 1:
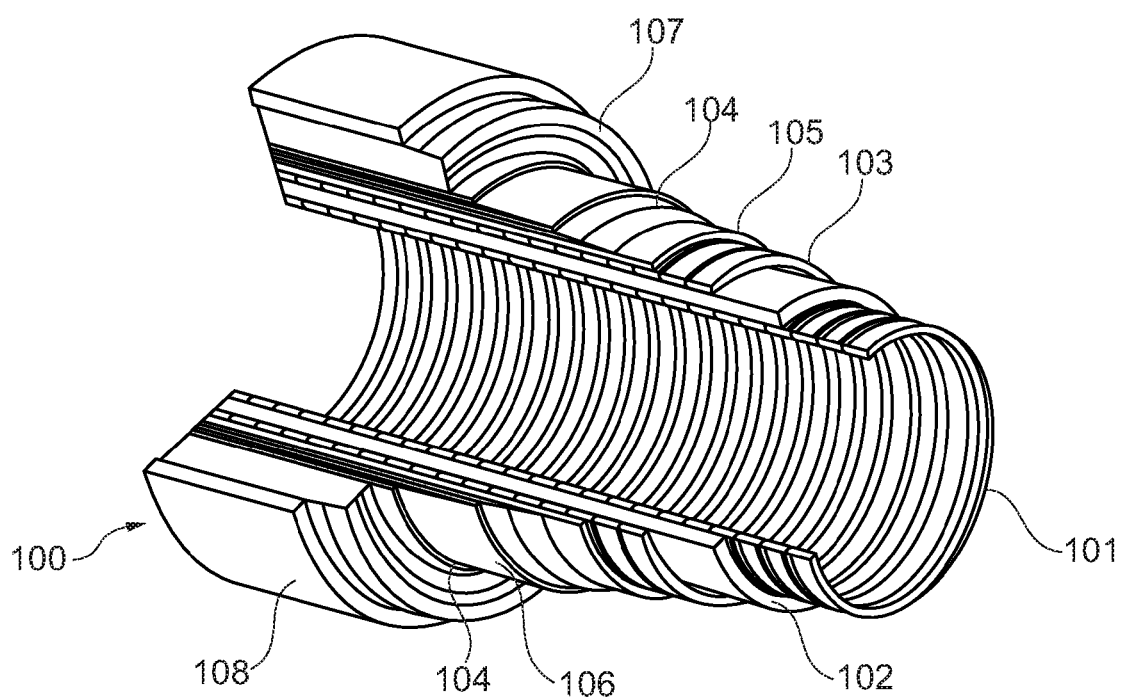
FIG. 1 illustrates a flexible pipe body.

Throughout this description, reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. For example, the pipe body may be formed from polymer layers, metallic layers, composite layers, or a combination of different materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. It will be appreciated that certain embodiments of the present invention are applicable to 'smooth bore' operations (i.e. without a carcass layer) as well as such 'rough bore' applications (with a carcass layer).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. The tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
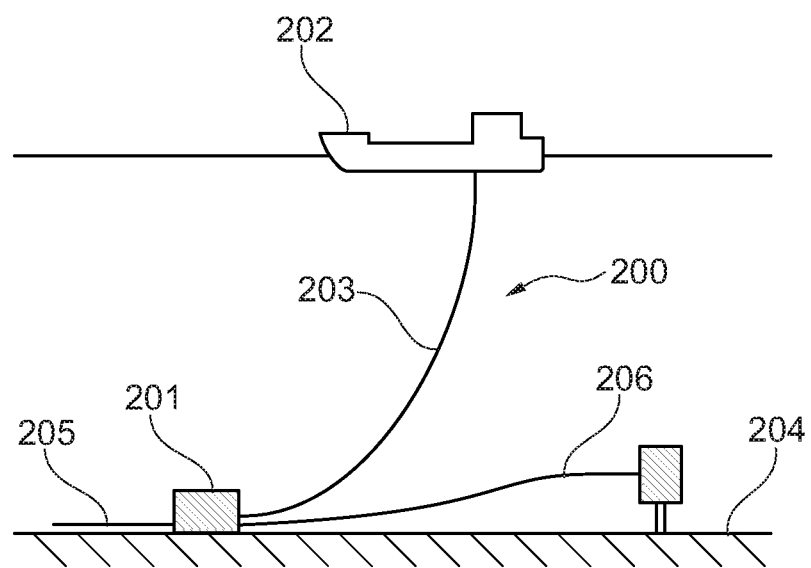
FIG. 2 illustrates a riser assembly.
Figure 3:
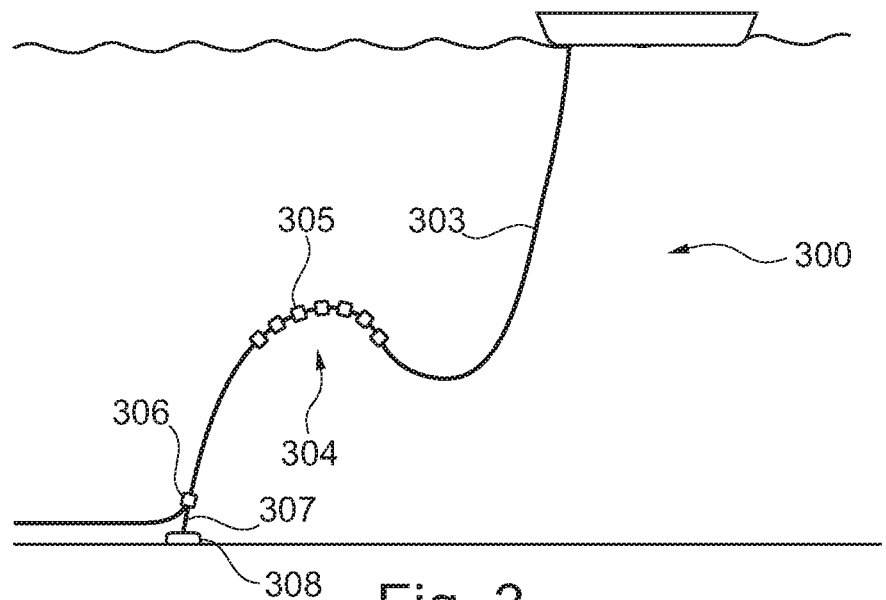
FIG. 3 illustrates a further riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility 202 may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), or a riser enclosed in a tube (I or J tubes).

FIG. 2 also illustrates how portions of flexible pipe can be utilised as a flow line 205 or jumper 206.

Figure 4:
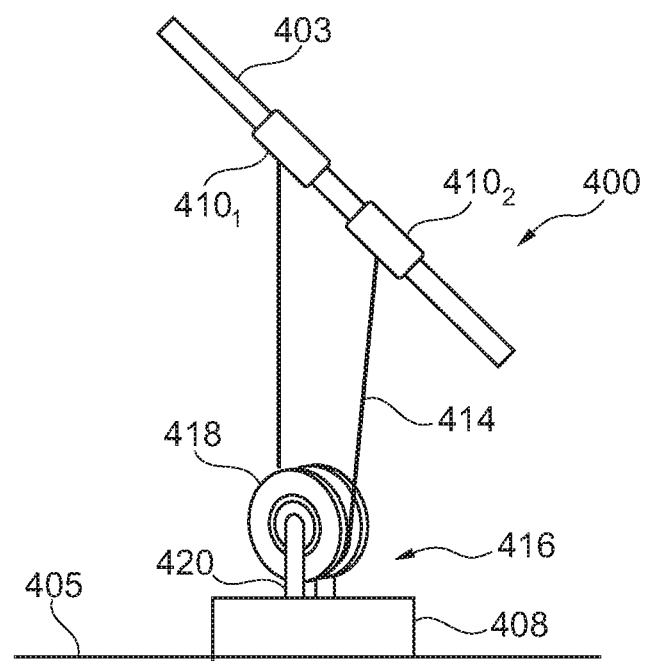
FIG. 4 illustrates a tether arrangement.

FIG. 4 illustrates a portion of a flexible pipe 403 of a riser assembly 400 tethered to a fixed structure (in this case the sea bed 405). The riser assembly includes at least one section of flexible pipe 403. A first attachment element $410_1$ is connected to a first portion of the flexible pipe 403 and a second attachment element $410_2$ is connected to a second portion of the flexible pipe 403.

In this example the first and second attachment elements $410_{1,2}$ are both clamps. Clamps for flexible pipes are well known by those skilled in the art for fastening to a pipe and allowing a further structure or piece of pipe jewelry to be affixed to the pipe. For brevity they will not be described in detail.

A single tether element 414 is connected at a first end thereof to the first clamp $410_1$ and connected at a second end to the second clamp $410_2$. In this example the tether element 414 is a length of cable. A central portion of the tether element 414 extends around and is movable about a connector element 416.

In this example the connector element 416 is a pulley 418 that connects the tether to a gravity base by a support 420. The cable 414 extends from the first clamp $410_1$ towards the pulley 418, around the pulley's circular body, and towards the second clamp $410_2$. The pulley 418 is a circular wheel around which the cable extends and can move with respect to. The pulley 418 includes flanges either side of a central portion of the wheel to create a channel in which the cable 414 can sit. In this way, the flanges help prevent the cable 414 from becoming disconnected from the pulley 418. The pulley 418 is connected to the support 420 via a pin extending through a central axis. The pulley 418 can therefore freely rotate about its central axis.

A gravity base 408 is positioned adjacent the sea bed 405, and acts as a fixed structure to which the riser assembly can be tethered. The support 420 is connected to the gravity base 408.

In use, as the first and second portions of the flexible pipe 403 (i.e. the portions of flexible pipe to which the attachment elements are connected) move, the central portion of the tether element 414 can move about the pulley 418 and the pulley 418 will rotate accordingly. Thereby an equal tension load at each of the first and second attachment elements $410_{1,2}$ is achieved. Since the central portion of the tether element 414 is free to move about the pulley 418, tension forces on the tether element 414 are transmitted around the pulley and are therefore substantially equal along the length of the tether element 414.

In this tether configuration, the total tension load on the riser is shared between the first and second clamps 410. A total tension load T is experienced at the connector element 416 and is distributed substantially evenly between both of the clamps 410. Therefore the tension load at each clamp is substantially 0.5 T or half of the total load on the flexible pipe. The tension load in the tether element 414 either side of the pulley is also substantially 0.5 T.

The first and second clamps are thereby tethered to the sea bed in a configuration so that, in use, in response to movement of the first and second portions of flexible pipe, the tension load at each clamp remains substantially equal.

The first and second clamps are linked by the tether. The first and second clamps are tethered to the gravity base via the pulley, which allows the tether to move with respect to the pulley.

A method of installation of the riser assembly shown in FIG. 4 may first include installing a length of riser including at least one section of flexible pipe in a manner known to those skilled in the art.

The first and second attachment elements 410 may be connected to the flexible pipe either before the riser is installed (e.g. as the riser is paid out from a vessel) or after the riser is installed under the sea. Aptly, the attachment elements 410 are connected to the flexible pipe before the riser is installed.

In this example, gravity base and connector element (pulley) are positioned at the sea bed in the required position with respect to the flexible pipe 403. A first end of the tether element is connected to the first attachment element, passed around the connector element and then connected at a second end to the second attachment element.

The length of the tether element is selected so that the required tension load is imparted on the riser at the time of installation, so as to hold the flexible pipe at a predetermined point above the seabed. The required tension load will vary depending on specific riser configurations and can be readily determined by those skilled in the art.

Figure 5:
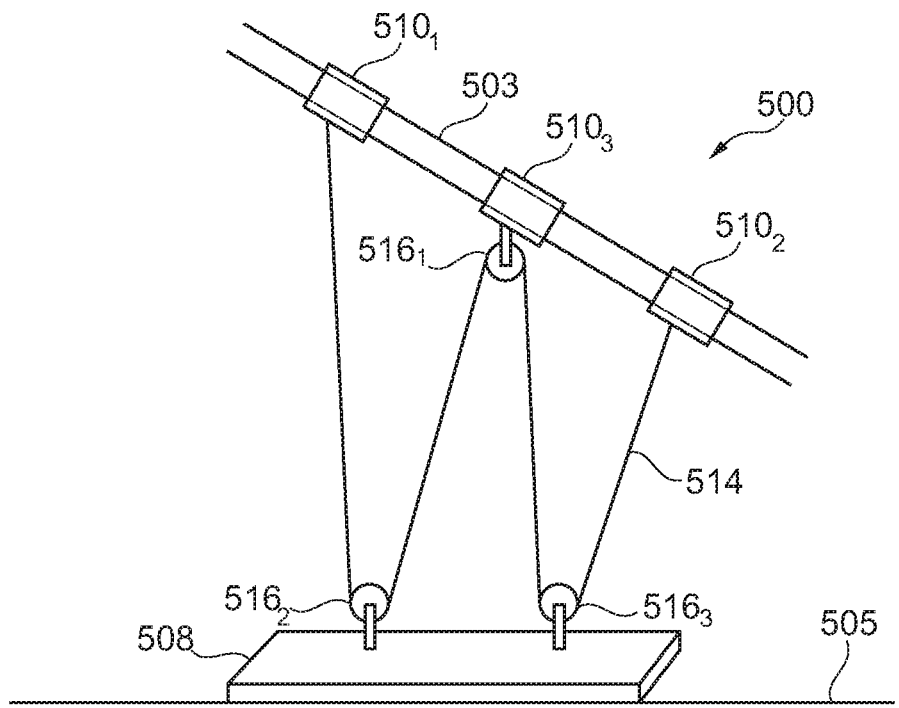
FIG. 5 illustrates a further tether arrangement.

FIG. 5 illustrates another example of a tether arrangement. In this example a riser assembly 500 includes a first attachment element $510_1$ connected to a first portion of a flexible pipe 503, a second attachment element $510_2$ connected to a second portion of flexible pipe and a third attachment element $510_3$ connected to a third portion of flexible pipe between the first and second portions of flexible pipe. Again, in this example each of the attachment elements $510_{1-3}$ is a clamp.

A first connector element $516_1$ is connected to the third attachment element $510_3$ and second and third connector elements $516_{2,3}$ are spaced apart and connected to a gravity base 508 adjacent the sea bed 505. In this example, both the second connector element $516_2$ and third connector element $516_3$ are connected to the same gravity base 508.

A single tether element 514, which is a cable, is connected at a first end to the first attachment element $510_1$ and connected at a second end to the second attachment element $510_2$. A central portion of the tether element 514 extends around and is movable about the first, second and third connector elements $516_{1-3}$ so that in use tension forces are substantially equal along the length of the tether element 514. Because the clamps $510_{1-3}$ are connected via the cable 514 extending around the connector elements $516_{1-3}$, the tension load at each of the attachment elements remains substantially equal even as the first, second and third portions of flexible pipe move.

This arrangement therefore allows total tether tension forces to be distributed substantially evenly across three clamps attached to the riser. It will be appreciated that this arrangement would be suitable for any number of tether clamps or attachment elements, by adding extra connector elements at the gravity base and at alternate clamps, as required.

Figure 6:
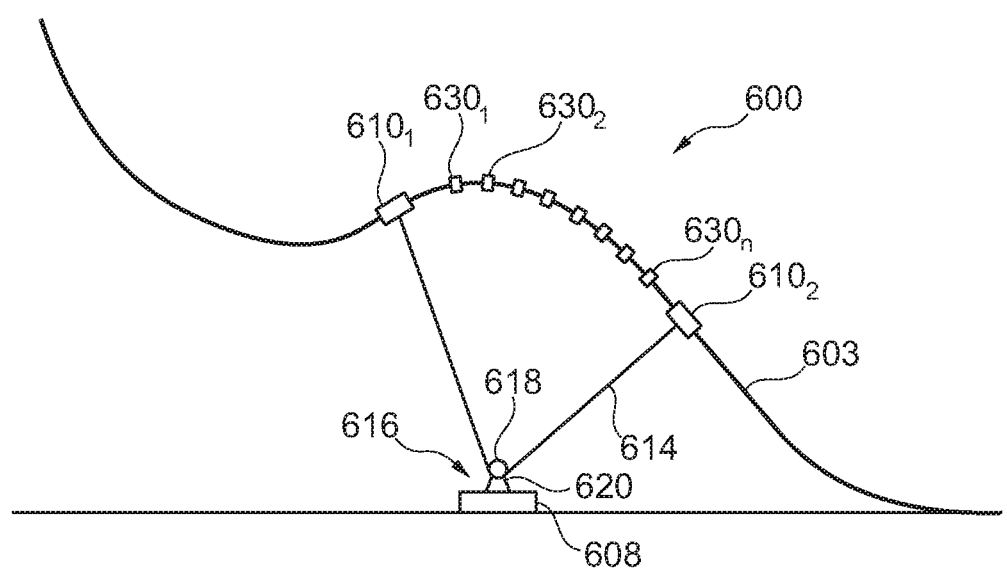
FIG. 6 illustrates a tethered riser assembly.

FIG. 6 illustrates another example of a tethered riser assembly 600. This tether arrangement is similar to the arrangement shown in FIG. 4 and therefore like parts will not be discussed in detail.

The assembly includes a flexible pipe 603, a first attachment element $610_1$ connected to a first section of flexible pipe and a second attachment element $610_2$ connected to a second section of flexible pipe. A tether element 614 is connected at a first end to the first attachment element $610_1$ and connected at a second end to the second attachment element $610_2$. In this example the first and second attachment elements $610_{1,2}$ are clamps.

Similarly to the arrangement of FIG. 4, a central portion of the tether element 614 extends around a pulley 618 of a connector element 616. The pulley is connected to a gravity base 608 via a support 620.

In addition, the assembly also includes a plurality of buoyancy modules $630_{1-n}$ connected to a section of flexible pipe that extends between the first and second attachment elements $610_{1,2}$. In this example there are eight buoyancy modules $630_{1-n}$ connected to the flexible pipe between the first and second attachment elements $610_{1,2}$, though it will be appreciated that any suitable number of buoyancy elements may be used, as determined by those skilled in the art.

The buoyancy modules $630_{1-n}$ allow the portion of pipe between the attachment elements to form a hog bend configuration. The hog bend portion of the pipe is restrained at either side by the tether element 614. This arrangement may be particularly useful for light weight riser structures, or in shallow water, to restrain the riser from excessive movement and improve stability.

It will be appreciated that for light weight composite risers, the buoyancy elements may not be required, because the riser may have sufficient natural buoyancy to assume a hog bend configuration between the first and second attachment elements.

For riser assemblies formed having multiple waves, the riser may be tethered in a similar manner at each hog bend region along the length of the riser.

Figure 7:
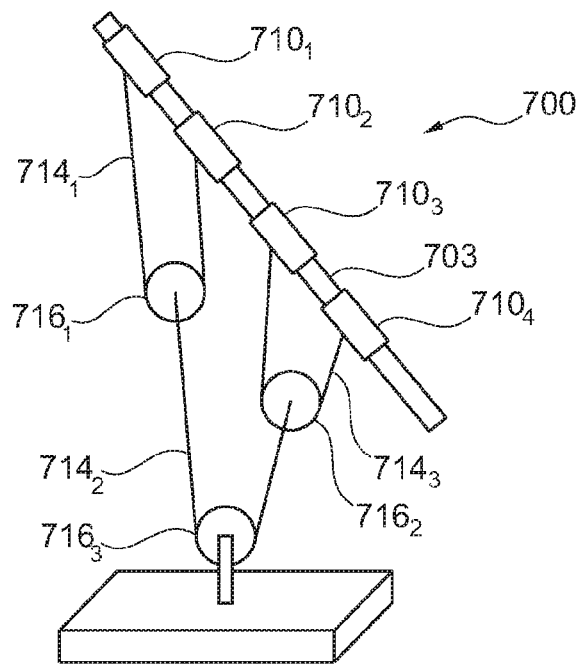
FIG. 7 illustrates a yet further tether arrangement.

FIG. 7 shows a portion another riser assembly 700 having an alternative tether arrangement. The riser assembly includes a flexible pipe 703 and first, second, third and fourth attachment elements $710_{1-4}$, connected to sequential first, second, third and fourth portions of flexible pipe respectively. In this example each of the attachment elements 710 are clamps.

A first tether element $714_1$ is connected at a first end to the first attachment element $710_1$ and is connected at a second end to the second attachment element $710_2$. A central portion of the first attachment element extends around and is movable about a first connector element $716_1$.

A second tether element $714_2$ is connected at a first end to the first connector element $716_1$ and is connected at a second end to a second connector element $716_2$. A central portion of the second tether element $714_2$ extends through and is movable about a third connector element $716_3$. As such, in use, tension forces can remain equal along the length of the second tether element $714_2$.

A third tether element $714_3$ is connected at a first end to the third attachment element $710_3$ and is connected at a second end to the fourth attachment element $710_4$. A central portion of the third tether element $714_3$ extends around and is moveable about the second connector element. As such, in use, tension forces are equal along the lengths of the third tether element $714_3$.

In this example, each of the connector elements $716_{1-3}$ includes a pulley and the respective tether element $714_{1-3}$ extends around and is movable about the pulley.

With the arrangement described in FIG. 7, a total tension load T on the third connector element $716_3$ is distributed via the tethers $714_{1-3}$ and connector elements $716_{1-2}$. The tension load at each of the first and second connector elements $716_{1,2}$ is substantially 0.5 T and the tension load experienced at each of the attachment elements is substantially 0.25 T. In this way, the total tension load can be divided across four separate attachment elements $710_{1-4}$, thereby reducing the strain on each attachment element.

This tether arrangement therefore allows total tether tension forces on the riser to be distributed substantially evenly across four clamps attached to the riser. It will be appreciated that this arrangement would be suitable for any number of clamps or attachment elements, by simply adding two extra connector elements and tether elements per extra pair of clamps, as required.

Each of the pulleys described in FIGS. 4 to 7 may be in the form of a solid bearing pulley (with bearing material such as Trelleborg's Orkot® TXMM Marine), or a sealed roller bearing, or other maintenance free equivalent marinized pulley system including corrosion resistant and/or marine growth resisting materials, such as copper.

Figures 8, 9:
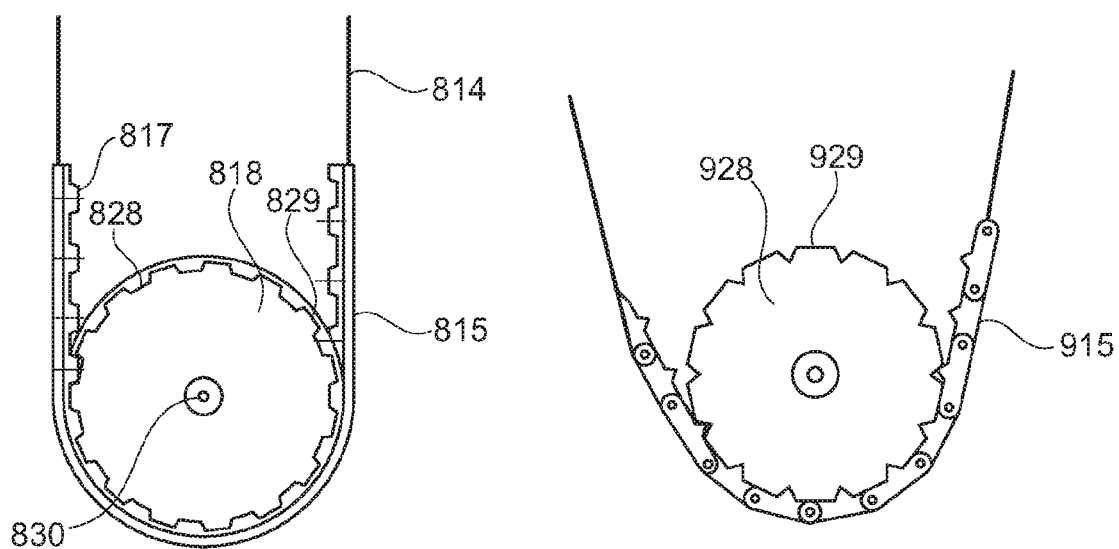
FIGS. 8 and 9 illustrate examples of pulley arrangements.

FIGS. 8 and 9 illustrate alternative pulley arrangements that can be used as a connector element in any of the examples described above in relation to FIGS. 4 to 7.

FIG. 8 shows a pulley 818 and a portion of a tether element 814. The pulley 818 includes a chain ring 828 that rotates about an axis 830. The chain ring includes a series of teeth 829 around the circumference.

A central portion of the tether element 814 includes a ribbed belt 815 having a series of teeth 817 that are sized and shaped to engage with corresponding teeth 829 on the chain ring 828. As such the central portion of the tether can move about the chain ring as the chain ring rotates.

The central portion of the tether element includes at least the portion of the tether that, in use, is likely to move around the pulley. The central portion of the tether element may extend along around 5 to 50% of the total length of the tether element, for example. Aptly, the central portion of the tether element may extend along around 10 to 30% of the total length of the tether element.

The remaining end portions of the tether element may be formed from cable, rope, chain, rigid rods, flexible fibre bands, or any other suitable tether material and may be connected to the central portion via shackles or clamps or through other physical connections or bonding mechanisms. Alternatively the tether element could form a spine for the ribbed belt to be moulded onto or bonded to.

There may optionally also be physical stoppers attached at or around the ends of the central portion of the tether element in order to ensure that the positioning of the central portion of the tether element around the pulley is not compromised (ensuring it remains in place), and/or to control the degree of allowed movement of the riser by limiting the slip/movement of the tether element around the pulley.

This arrangement may be beneficial to help prevent wear on the central portion of the tether element 814 that comes into contact with the pulley. The arrangement may provide more positive locating between the tether and pulley.

FIG. 9 is a similar arrangement to FIG. 8, but in this example the central portion of the tether element is a chain 915 having links sized and shaped to engage with teeth 929 on a chain ring 928.

Figure 10:
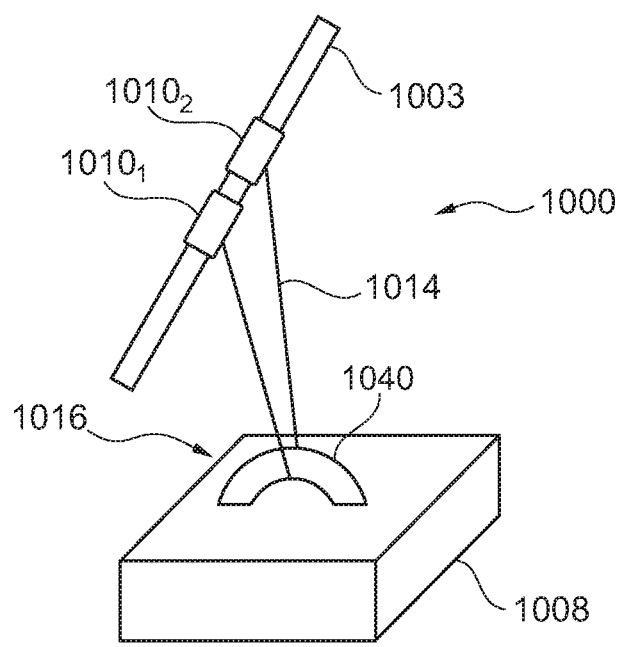
FIG. 10 illustrates an alternative tether arrangement.

FIG. 10 illustrates a portion of a riser assembly 1000 having an alternative tether arrangement. The riser assembly includes a flexible pipe 1003, a first attachment element $1010_1$ connected to a first portion of flexible pipe and a second attachment element $1010_2$ connected to a second portion of flexible pipe. In this example the first and second attachment elements $1010_{1,2}$ are both clamps.

A single tether element 1014 is connected at a first end to the first attachment element $1010_1$ and connected at a second end to the second attachment element $1010_2$. In this example the tether element 1014 is a length of cable. A central portion of the tether element 1014 extends around and is movable about a connector element 1016.

In this example the connector element 1016 includes a shackle 1040. The shackle is substantially U-shaped and is preferably formed from a rigid material. For example, the shackle may be metal, or composite, and may be coated or un-coated. Here the shackle is connected to a gravity base 1008 on the sea bed.

As the first and second portion of the flexible pipe 1003 move, a central portion of the tether element slides around the shackle so that tension forces are equal along the length of the tether and so that a total tension force T at the shackle is distributed substantially evenly between the first and second attachment elements 1010. Therefore the tension load at each attachment element 1010 is approximately 0.5 T. The tension load in the tether is also approximately 0.5 T.

In some environments where transverse motion is more likely, a shackle may be useful because the shackle allows a greater degree of movement of the tether element compared to a pulley. Alternatives to shackles could comprise a D-ring or a master-link element connected directly or indirectly to the gravity base. When a connector element comprises a shackle, D-ring or master-link, a curvature limiter device may be incorporated to ensure the tether element is not damaged through over bending around the shackle, D-ring or master-link. The curvature limiter device may be a sleeve or a curved channel, or stiffening material incorporated into or onto the tether element.

It will be appreciated by those skilled in the art that there will be a certain degree of friction between the tether element and the shackle. In order to minimize friction (and therefore wear) between the tether and the shackle the tether element and/or the shackle preferably comprise a low friction material, e.g. PTFE (polytetrafluoroethylene). Alternatively the shackle may comprise a combination coating with corrosion resistance and relatively low friction coefficient, such as a nickel/cobalt interdiffused coating system, or boron nitride co-deposits with a polymer matrix, with or without an additional low friction polymer based coating on top.

Aptly, at least a central portion of the tether element 1014 is formed from a low friction material. The central portion of the tether element may be formed from a carbon composite belt with a low friction material incorporated into the matrix, or high modulus polyester fibre bundle, braided into a low friction rope or tether, or a metallic wire reinforced band, impregnated and/or coated with a low friction coefficient coating material such as one comprising PTFE.

Rather than the shackle 1040 or tether element 1014 itself being formed from a low friction material, a low friction sleeve or coating may extend around the shackle 1040 or tether element 1014. The low friction sleeve or coating may be comprised of PU (polyurethane), PE (polyethylene), polyamide or a fluoropolymer for example with or without additions of secondary polymer materials such as PTFE to further reduce their friction coefficients.

Reducing friction between the shackle and the tether element has the additional advantage that the tension forces can be effectively transmitted through the tether around the shackle and therefore the tension load at each attachment element can remain substantially equal.

Figure 11:
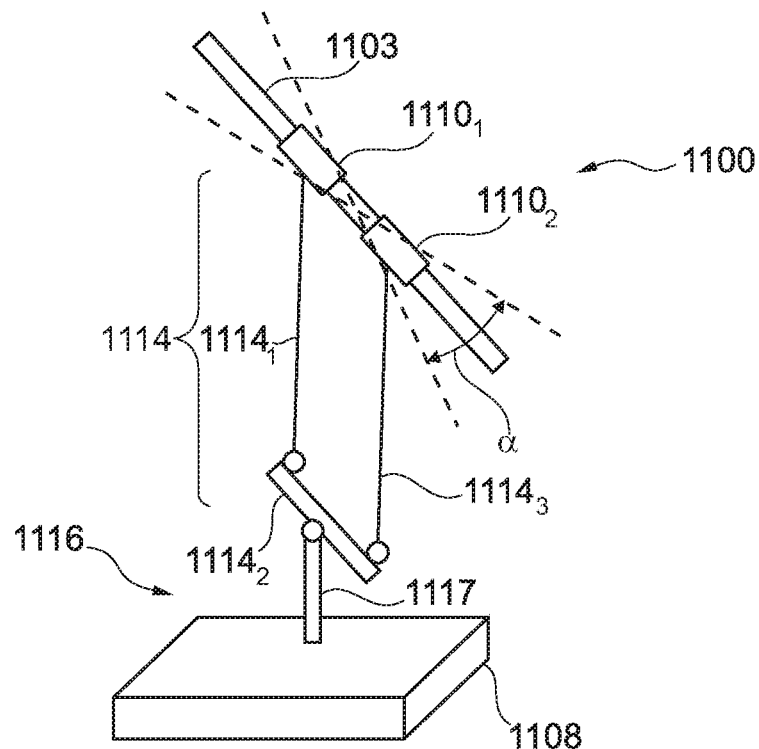
FIG. 11 illustrates a further alternative tether arrangement.
In the drawings like reference numerals refer to like parts.

FIG. 11 illustrates another alternative configuration. A riser assembly 1100 includes a flexible pipe 1103, a first attachment element $1110_1$ connected to a first portion of flexible pipe and a second attachment element $1110_2$ connected to a second portion of flexible pipe.

A tether element 1114 is connected at a first end to the first attachment element $1110_1$ and is connected at a second end to the second attachment element $1110_2$. The tether element 1114 includes a central rigid portion $1114_2$ and two end regions $1114_{1,3}$.

The central rigid portion $1114_2$ of the tether element is pivotally connected to a connector element 1116 (e.g. via a pin joint). The connector element 1116 is the pivot connection, which in this example is provided on a post element 1117. A gravity base 1108 is positioned adjacent the sea bed and the post element 1117 is connected to and extends from the gravity base 1108. The rigid central portion $1114_2$ of the tether element is pivotally connected to the post element 1117 at a distal end from the gravity base 1108.

End regions $1114_{1,3}$ of the tether element 1114 are pivotally connected to the rigid central portion $1114_2$. The end regions $1114_{1,3}$ of the tether element are connected to the rigid central portion $1114_2$ at spaced apart positions either side of the pivotal connection with the post element 1117 of the connector element 1116. In this way, as the first and second portions of flexible pipe move, the rigid central portion $1114_2$ pivots with respect to the connector element 1116 to thereby equalise the tension in each of the end regions $1114_{1,3}$ of the tether element 1114 and at each of the attachment elements 1110.

The end regions $1114_{1,3}$ of the tether element 1114 can be formed from rope, chain, cable, rigid rod, or any other suitable tether, for example. Optionally, each end region of the tether may be formed from a different material. For example, each end region of the tether may be formed from materials having a different elasticity. In certain situations, this may help to maintain even tension distribution along each tether.

In use, as the first and second portions of the flexible pipe move, the rigid central portion $1114_2$ can tilt about the pivot point to equalise tension distribution in each of the end regions of the tether element.

This arrangement is particularly useful for riser assemblies where, in use, an angular deviation α of the first and second attachment elements 1110 from a neutral position (standard position prior to movement) is likely to be up to around 20°.

When the riser assembly is installed, the lengths of the end regions of the tether element can be selected such that when the riser assembly is in a neutral position, the central rigid portion is substantially perpendicular with the post element 1117. In this way, the rigid central portion 1115 can pivot with respect to the post element 1117, in response to a larger degree of movement of the first and second portions of flexible pipe.

The length of the rigid central portion of the tether can also be selected depending on specific riser requirements so as to accommodate the maximum movement expected by the first and second portions of flexible pipe. For example, for a larger degree of expected movement (larger angle α), the central rigid portion will be longer.

Various modifications to the detailed arrangements as described above are possible. For example, although the attachment elements have been described above as clamps, the attachment elements could be a buoyancy element, a ballast module, an end fitting, or the like. For example, in the arrangement of FIG. 4, the first attachment element $410_1$ could be an end fitting and the second attachment element $410_2$ could be a clamp. In another example, all of the attachment elements could be buoyancy elements or ballast modules.

Although the tether elements have been described above as including a length of cable, the tethers may be formed from other suitable materials. For example the tether elements may comprise a length of rope, chain, or other flexible filament or may comprise a flexible belt of woven carbon fibre material or other suitable material. Aptly, the tether elements are non-elastic or have a very limited degree of elasticity so that tension forces can more effectively be transmitted around the connector element and so that tension forces are more likely to remain substantially constant along the length of the tether and therefore equal at each attachment element.

As mentioned above, the tether elements may comprise a length of cable, or the like, and further comprise a portion of chain or ribbed belt, or a rigid central portion.

In the embodiments above where the tether element includes a central portion of a different material to the two end portions, the end portions of the tether element (i.e. the portions of the tether element that do not extend around the connector element), can be formed from a rigid material. For example, the end portions may be formed from a rigid metal rod or rigid composite rod.

Although the examples above all show the attachment elements connected to the same length of flexible pipe, one or more of the attachment elements may be connected to a further length of flexible pipe, for example a length of flexible pipe that is part of a further riser assembly, or an adjacent length of flexible pipe in the same riser assembly.

Although the examples shown in FIGS. 4 to 7 all include connector elements including a pulley, each of these connector elements may alternatively include a shackle as described in relation to FIG. 10 or a post element in combination with a tether element having a rigid central portion, as described in relation to FIG. 11.

Although in the examples above, some of the connector elements have been described being connected to a gravity base on the sea bed, in some embodiments the shackle, the pulley support or the post element may be connected directly to a portion of the sea bed (e.g. a rock on the sea bed) via one or more rock bolts, for example.

With the above-described arrangements a tension load can be distributed evenly across two or more attachment elements connected to the flexible pipe. This allows a portion of riser to be tethered where the total tension load is likely to be above the load capacity of a single tether clamp, because the total tension load is divided equally between each clamp.

The attachment elements are linked by a single tether element, whether the tether element is a single piece of cable or has intermediate portions such as the chain or rigid central portion of FIG. 11. The attachment elements are tethered to the fixed structure via the connector, and the connector allows the tether element to move with respect to the connector.

With the above described arrangements, installation of the riser assembly can be made easier and more time efficient because the tension at each attachment element does not have to be adjusted separately.

With the above described arrangements a riser assembly can be tethered with a tether element load greater than the maximum load capacity of a single clamp or attachment element. Since the tension loads are continually adjusted so that they are distributed evenly across two or more attachment elements, the risk of one of the attachment elements becoming overloaded and failing or causing damage to the riser is significantly reduced or mitigated.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A riser assembly for transporting fluid from a subsea location comprising:
   a first attachment element connected to a first portion of flexible pipe;
   a second attachment element connected to a second portion of flexible pipe;
   wherein the first attachment element and second attachment element are connected by at least one tether element, via a fixed structure in a configuration such that, in use, in response to movement of the first and second portions of flexible pipe, the tension load at any moment in time, at each attachment element, remains substantially equal;

wherein a central portion of the at least one tether element extends around and is moveable about a connector element such that, in use, tension forces are substantially equal along the length of the at least one tether element;

wherein the at least one tether element is the only connection between the first attachment element and the second attachment element; and wherein a length of the at least one tether element from the first attachment element to the second attachment element is greater than a length of the flexible pipe from the first attachment element to the second attachment element;

wherein the fixed structure is a gravity base positioned on the seabed and wherein the connector element is anchored to the gravity base so that the connector element is retained at a fixed position relative to the gravity base.

2. The riser assembly as claimed in claim 1, wherein the connector element comprises a pulley and the central portion of the at least one tether element extends around the pulley.

3. The riser assembly as claimed in claim 2 wherein the pulley comprises a chain ring element and the central portion of the at least one tether element comprises a chain or ribbed belt configured to engage with the chain ring element.

4. The riser assembly as claimed in claim 1, wherein the connector element comprises a D-ring, master-link, or shackle and the central portion of the at least one tether element extends through the D-ring, master-link or shackle.

5. The riser assembly as claimed in claim 1, further comprising a second tether element connected at a first end to the connector element and connected at a second end to a second connector element, wherein a central portion of the second tether element extends around and is movable about a third connector element such that, in use, tension forces are substantially equal along the length of the second tether element.

6. The riser assembly as claimed in claim 5 further comprising:
a third attachment element connected to a third portion of flexible pipe;
a fourth attachment element connected to a fourth portion flexible pipe;
a third tether element connected at a first end to the third attachment element and connected at a second end to the second attachment element, wherein a central portion of the third tether element extends around and is movable about the second connector element such that, in use, tension forces are substantially equal along the length of the third tether element.

7. The riser assembly as claimed in claim 1 further comprising:
a third attachment element connected to a third portion of flexible pipe; and
a second and third connector element spaced apart adjacent the fixed structure;
wherein the connector element is connected to the third attachment element and wherein the central portion of the at least one tether element also extends around and is moveable about the second and third connector element such that, in use, tension forces are substantially equal along the length of the at least one tether element.

8. The riser assembly as claimed in claim 1, wherein the attachment elements each comprise a clamp, a buoyancy element, a ballast element, or an end fitting.

9. The riser assembly as claimed in claim 1, wherein the at least one tether element comprises a first upper end portion connected to the first attachment element and a second upper end portion connected to the second attachment element, and the central portion extends downwardly from the first and second upper end portions toward the connector element.

10. A method of installing a riser assembly for transporting fluid from a subsea location, the method comprising:
connecting a first attachment element to a first portion of flexible pipe;
connecting a second attachment element to a second portion of flexible pipe; and
connecting the first and second attachment elements to each other with a tether element, via a fixed structure in a configuration such that, in use, in response to movement of the first and second portions of flexible pipe, the tension load at any moment in time, at each attachment element, remains substantially equal;
wherein the method further comprises providing a central portion of the tether element extending around and moveable about a connector element such that, in use, tension forces are substantially equal along the length of the tether element;
wherein the at least one tether element is the only connection between the first attachment element and the second attachment element; and
wherein a length of the at least one tether element from the first attachment element to the second attachment element is greater than a length of the flexible pipe from the first attachment element to the second attachment element;
wherein the fixed structure is a gravity base positioned on the seabed and wherein the connector element is anchored to the gravity base so that the connector element is retained at a fixed position relative to the gravity base.

11. The method as claimed in claim 10, wherein the connector element comprises a pulley and the central portion of the tether element extends around the pulley.

12. The method as claimed in claim 11 wherein the pulley comprises a chain ring element and the central portion of the tether element comprises a chain or ribbed belt configured to engage with the chain ring element.

13. The method as claimed in claim 10, wherein the connector element comprises a shackle or D-ring or master-link, or any combination of these, and the central portion of the tether element extends through the shackle, D-ring or master-link.

14. The method as claimed in claim 10, wherein the attachment elements each comprise a clamp, a buoyancy element, a ballast element, or an end fitting.

15. The method as claimed in claim 10, wherein the tether element comprises a first upper end portion connected to the first attachment element and a second upper end portion connected to the second attachment element, and the central portion extends downwardly from the first and second upper end portions toward the connector element.

* * * * *